United States Patent [19]
Becker

[11] Patent Number: 5,860,510
[45] Date of Patent: Jan. 19, 1999

[54] HOSE BELT CONVEYOR, AND DRIVE ASSEMBLY THEREFOR

[75] Inventor: Karl Becker, Wilhelmshafen, Germany

[73] Assignees: Dunlop-Enerka B.V., Drachten, Netherlands; FMW Forderanlagen und Maschinebau GmbH, Wilhelmshafen, Germany

[21] Appl. No.: 637,620

[22] PCT Filed: Oct. 27, 1993

[86] PCT No.: PCT/NL93/00214

§ 371 Date: Aug. 12, 1996

§ 102(e) Date: Aug. 12, 1996

[87] PCT Pub. No.: WO95/11848

PCT Pub. Date: May 4, 1995

[51] Int. Cl.[6] .................................................. B65G 15/08
[52] U.S. Cl. .......................................... 198/819; 198/811
[58] Field of Search ..................................... 198/819, 811

[56] References Cited

U.S. PATENT DOCUMENTS 3,164,238  1/1965  McCullagh ............................. 198/819
3,661,244  5/1972  Koyama ................................. 198/819
3,734,270  5/1973  Foody ................................... 198/811

FOREIGN PATENT DOCUMENTS 3 319 862   12/1984  Germany .
4 036 731    4/1991  Germany .
WO 90/09942  9/1990  WIPO .
WO 93/08107  4/1993  WIPO .

*Primary Examiner*—Joseph E. Valenza
*Attorney, Agent, or Firm*—Young & Thompson

[57] ABSTRACT

Hose belt conveyor (1), comprising an elongated belt 2) which can be folded to a closed hose. At the edges it is provided with thickened parts (3) which are placed resting against each other during the formation of the hose. These thickened parts bound a V-shaped part which widens in the direction away from the hose which has been formed by the belt (2). The V-shaped part is placed between two drive rollers (12). By selecting the angle of the V-shaped part between 30 and 90°, it has been found that it is possible to provide for the hose belt conveyor (1) to be driven like a V-belt. The invention also relates to a drive unit (7) for the above-described hose belt conveyor.

11 Claims, 4 Drawing Sheets

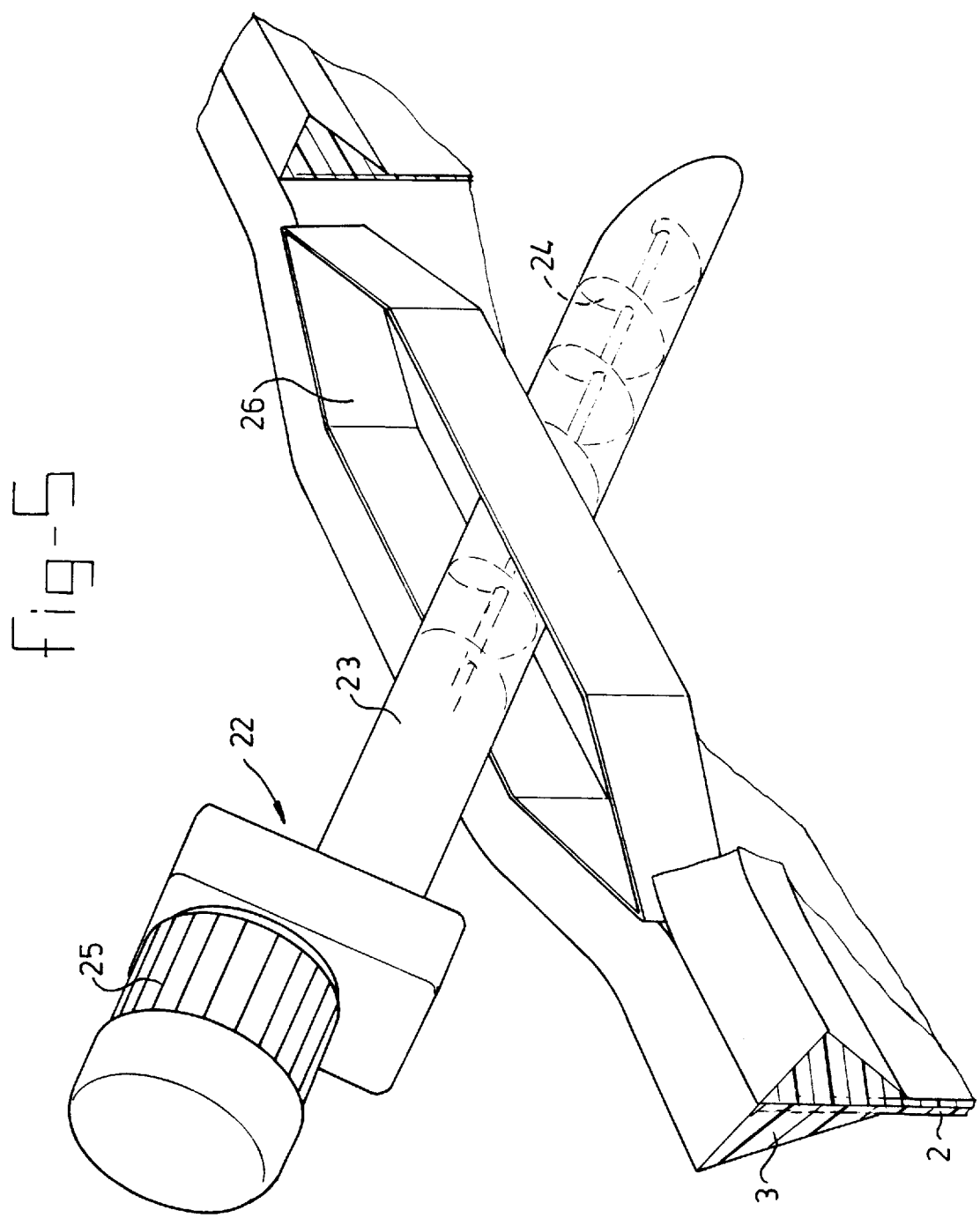

HOSE BELT CONVEYOR, AND DRIVE ASSEMBLY THEREFOR

FIELD OF THE INVENTION

The present invention relates to a hose belt conveyor.

BACKGROUND OF THE INVENTION

Such a hose belt conveyor is known from the German Offenlegungsschrift 4,036,731. To drive the adjacent thickened parts the abutting sides are provided with opposed recesses to accommodate a wire structure comprising two interconnected wires. These wires have to transmit driving forces.

This structure is relatively complicated but necessary to guarantee sufficient drive for the thickened parts.

From the British patent application 2,007,178 a hose belt conveyor is known wherein the thickened parts are trapezium-shaped. When these thickened parts lie against each other, a V is formed with an angle greater than 120°. The two parts of the V may be supported on rollers, as shown in FIG. 3 of this British Patent Specification. It is necessary here for the thickened parts to be pressed against each other, and this is achieved by making the rollers stepped. The first part acts upon the above-described V-forming part, while the second part of the rollers connects to the top side of the trapezium of each of the thickened parts. This means that the rollers have to be of relatively complex design and that a considerable measurement tolerance is necessary. If the distance between the parallel outsides of the thickened parts is reduced through wear, it will be necessary to adapt the spacing of the raised sides of the rollers. For this purpose, it is necessary to provide for the rollers to move relative to one another. In the case of the design according to this British Patent Specification, the drive is by means of a pair of rollers which enclose the trapezium-shaped thickened part on all sides. Such a drive is relatively complex and, as in the case of conventional conveyor belts, is generally provided at only one place. This makes it necessary for the belt to be provided with longitudinal reinforcements for absorbing the driving forces produced by the single drive motor and extending over the length of the belt. Such a drive also means that the length of such belts is limited, because the driving forces would otherwise become too great for the longitudinal reinforcement, or because otherwise the belt becomes expensive.

From the PCT-application 93/08107 a hose belt conveyor is known wherein the sides abutting each other are perpendicular to the extension of the hose belt. It is not possible to clamp the thickened parts between two V-shaped driving or guiding members.

The invention aims to provide a more simplified design for hose belt conveyors.

SUMMARY OF THE INVENTION

The invention is based on the idea that the two thickened parts should be designed in such a way that if they are placed against each other a V is produced, more or less corresponding to the V used in belt drives. It has also been found that if the angle range according to the invention is used, the two thickened parts do not have the tendency to slide past each other, and if they are placed between rollers placed at a corresponding angle, a self-centering effect occurs. This makes it unnecessary for the thickened parts to be provided with further peripheral edges which have to be in engagement with guide and/or drive means.

It is also not necessary to incorporate further drive structures such as interconnected wires.

Should wear of the thickened parts occur, the V formed will lie "deeper" in the space bounded by the drive or guide means, and it is not necessary to design these drive or guide means so that they can be moved relative to each other. It has also been found that with this embodiment it is extremely simple to provide a drive by placing the V formed by the thickened parts in a correspondingly shaped cavity consisting of two rollers placed opposite each other at essentially the same angle as the angle of the V. If at least one of the rollers is driven, this can provide for the drive of the hose belt conveyor according to the invention. If such a pair of rollers is fitted at regular intervals along the length of the pocket conveyor, it is no longer necessary to use a central drive, but drives displaced along the length of the belt can be used. Such a decentralized system is cheaper to produce, uses less energy, and also makes it unnecessary to provide longitudinal reinforcements which over great lengths can transmit forces in the belt. For, the forces only have to be transmitted in the section between two drives. It is also possible to make the belt of unlimited length. According to an advantageous embodiment of the invention, both the conveying part and the return part are moved in the same position. In other words, through the provision of angles, the return part can move back. The advantage of this is that no material can escape from the hose belt conveyor in the return belt either. This means that it is no longer necessary to empty the hose belt conveyor completely at the delivery end. Remaining material can be removed during a subsequent passage through. Further protection of the environment or further hygiene is consequently provided. It has been found in experiments that a particularly small radius of curvature of the hose belt conveyor can be used in the horizontal plane. Even a radius of 0.5 m did not give rise to problems. It has been found that a hose belt conveyor according to the invention can move at relatively high speeds. Values of up to ten meters per second are given as an example here. By partially opening the hose, material can be removed from it by means of, for example, a worm conveyor.

Although it is no longer necessary to provide the reinforcements in the belt for tensile forces extending over great lengths, it may still be desirable for certain applications to provide reinforcements in the lengthwise direction, if only for transmitting the forces over a short distance between two drive stations.

Transverse reinforcements may also be needed to take the weight of the material which has to be moved by means of the hose belt conveyor. Such transverse reinforcements are preferably provided in the belt of the hose belt conveyor.

The thickened parts can also be provided with reinforcements, such as, for example, those used in the case of V-belts.

The drive or guide rollers in the simplest embodiment can have a cylindrical outer surface. In this case, raised edges such as those described in the prior art are not necessary. They could possibly have a slightly curved surface.

It is possible not only to guide the hose conveyor by means of the above-described rollers, but also to a slide support. This slide support may comprise a smooth surface which acts upon the legs of the V and/or a surface which is provided with openings through which, for example, compressed air is blown so that the belt floats slightly above it.

It is also possible to provide a linear motor placed near the thickened parts for (partial) drive of the belt. Parts reacting to the magnetic field of the linear motor can then be provided in the thickened parts, for example ferromagnetic parts or permanent magnets. These can be in the form of triangular parts lying at regular intervals.

Another method of guiding is possible if at least two roller assemblies lying at a distance from each other are used. Instead of direct action of the rollers on the thickened parts, an auxiliary belt can be provided around two rollers lying at a distance from each other, which auxiliary belt is in turn in contact with the thickened parts. Amongst other things, this reduces the risk of slippage between the rollers and the thickened parts. Such an auxiliary belt could be in the form of a V-belt, so that a maximum force can be transmitted from the roller in question to the thickened part. Apart from the above-described supporting of the belt by means of an outflowing fluid, such as air, it is also possible to drive the belt with the same fluid.

BRIEF DESCRIPTION OF THE DRAWINGS

The invention will be explained in greater detail below with reference to exemplary embodiments shown in the drawing, in which:

FIG. 5 shows a delivery station for the hose belt conveyor according to the invention.

DETAILED DESCRIPTION OF THE INVENTION

Figure 1:
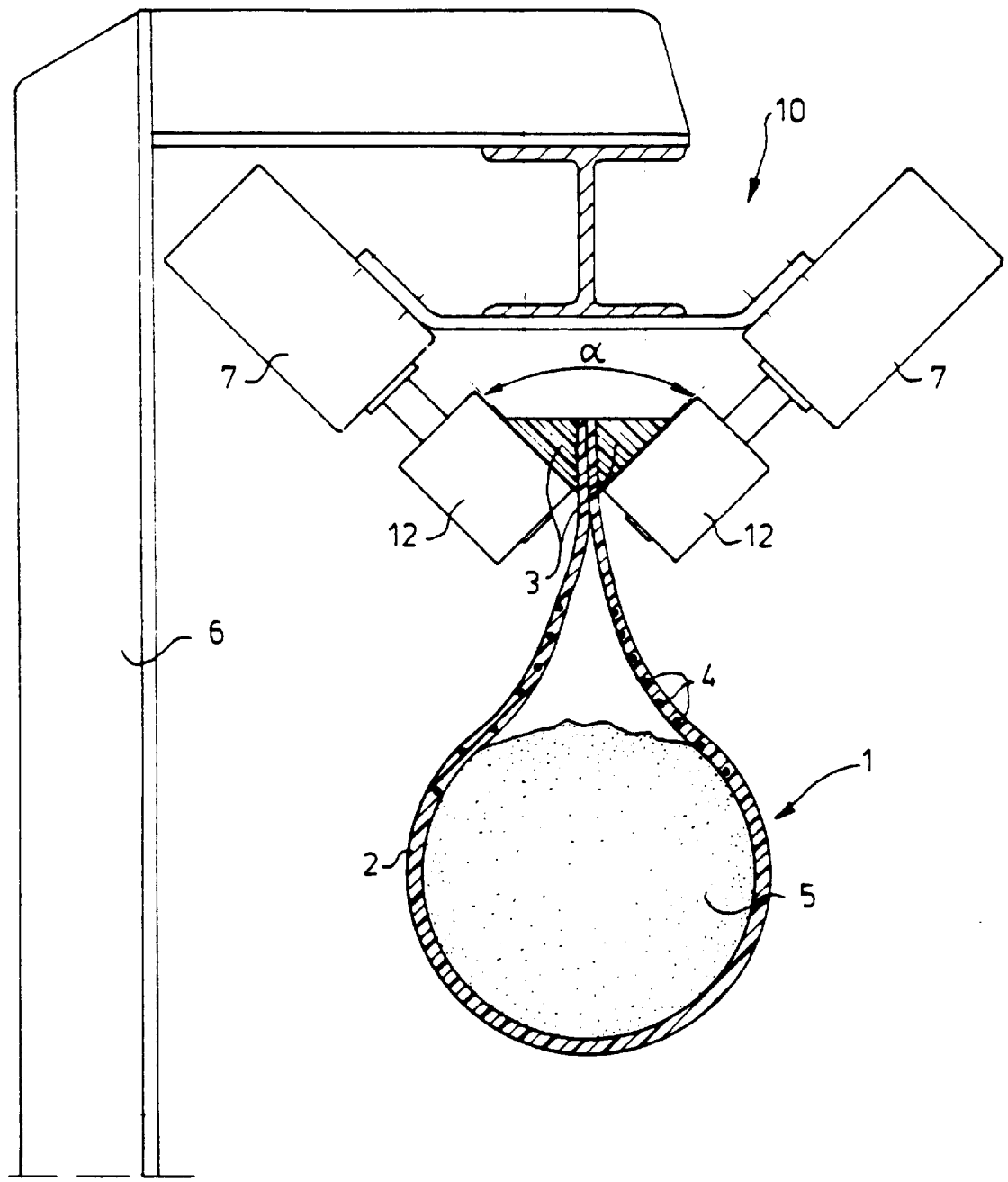
FIG. 1 shows partially in section the hose belt conveyor with the drive unit according to the invention.

In FIG. 1 the hose belt conveyor is indicated by 1. It comprises a belt 2 which is folded to the form of a hose. Belt 2 is provided with thickened parts 3 at the ends, as can be seen more clearly from FIGS. 1 and 6. These thickened parts are both a right-angled triangle. If the flat sides of the right-angled thickened parts 3 are placed such that the belt edges are against each other as shown in FIG. 1, a V is produced. The angle α of the V according to the invention preferably lies between 30° and 90°, more particularly between 35° and 70°, and in a preferred embodiment lies between 50° and 60°. This means that the bottom angle of the thickened parts V lies between 15°–45°, 17.5°–35° and 25°–30°, respectively. It has been found that with such an angle, the opposite straight sides of the right-angled triangles 3 have such grip that mutual displacement does not occur. These sides are pressed against each other via the longitudinal edges of the belt through the weight of the hanging tubular part and the presence of the rollers 11 and 12 of the drive unit, which is indicated in its entirety by 10. It is not necessary here to provide means in these straight sides for preventing mutual displacement, such as dovetail constructions and other special measures. It has been found that the V-shape used here permits a rise of the belt up to 45° in the vertical plane without slippage occurring. It is therefore possible, when the belt is moving in the closed state through bends, for the faces of the two straight sides of the triangular thickened parts where they go against each other via the belt edges to be tilted slightly relative to the horizontal in that position.

The contents of the hose belt 2 are indicated by 5. The drive unit 10 already mentioned above is fitted on a frame 6. Bending belt 2 to a hose means that the width of the hose belt conveyor during conveyance of the same quantity of material can be considerably smaller than that in the case of flat conveyors according to the prior art. The rollers 11 and 12 are both connected to a drive motor 7. A freewheel construction is present between drive motor 7 and the rollers in question, so that should one of the motors break down or irregularities occur in the running speed, there is no unnecessary load on the V. The material from which both the belt and the thickened parts 3 are made may be any material known in the prior art for conveyor belts, such as rubber fabrics, reinforced or otherwise. Through the abovementioned angle, it is possible to provide a drive of the hose belt conveyor 1 in a simple manner. In the case of the abovementioned angle no slippage occurs, on the one hand, because grip like a V-belt in a pulley is achieved. On the other hand, the chosen angle means that the wedge force caused by the hose with contents is not so great that the thickened parts are damaged by the rollers or move between them or inadmissibly jam.

Figure 2:
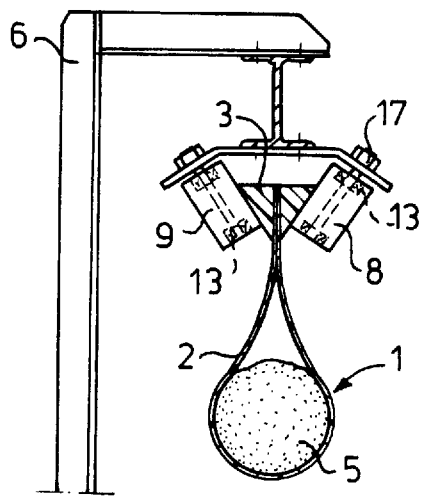
FIG. 2 shows a guide station for the hose belt conveyor according to the invention, in a first embodiment.
Figure 3:
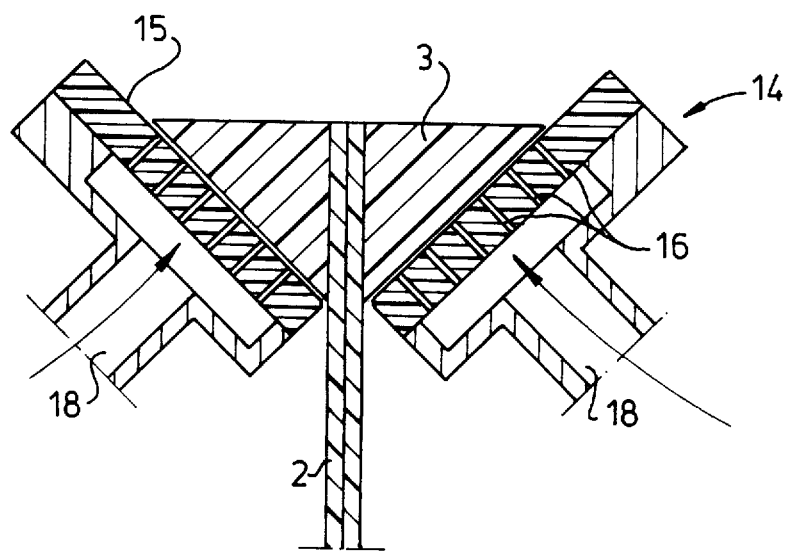
FIG. 3 shows a guide station for the hose belt conveyor according to the invention, in a second embodiment.

FIGS. 2 and 3 show guide stations. In FIG. 2 the guide station consists of a frame which corresponds to the frame shown in FIG. 1 and is also indicated by 6. Fixed to it are non-driven rollers 8 and 9 which are supported on pin 17 by means of bearings 13. FIG. 3 shows an embodiment in which a slide support 14 is provided for bearing the thickened parts 3 of the belt. This support is firstly provided with a smooth surface layer 15 made of, for example, Teflon material, and provided with openings 16 which are connected by way of line 18 to a source of compressed air. This will cause the thickened parts 3 to float above slide support 14 during operation.

Figure 4:
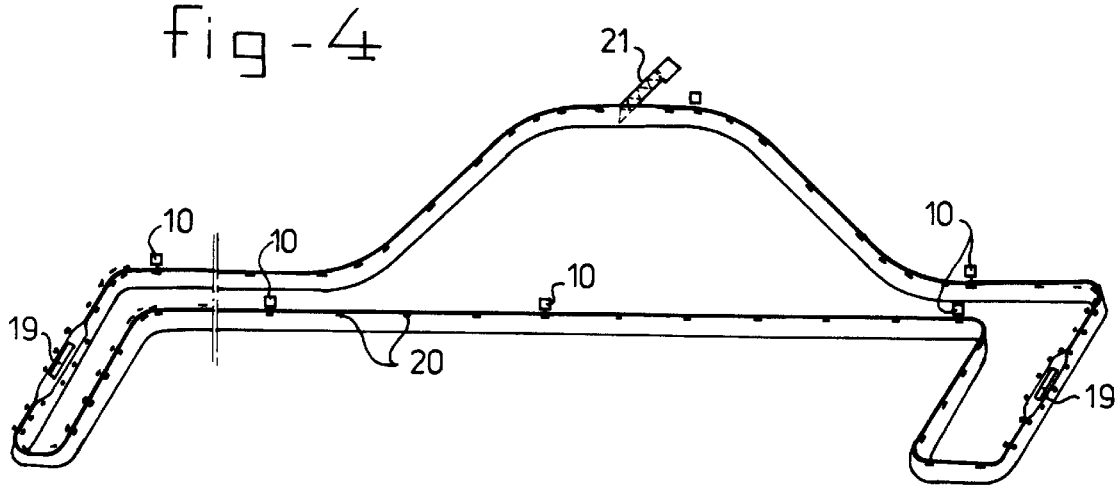
FIG. 4 shows an arrangement with different drive and guide stations for an endless hose belt conveyor according to the invention.

With the aid of the above-described drive and guide devices, it is possible to construct a complete track for the hose belt conveyor 1, as shown in FIG. 4. In this figure the drive units are indicated by 10 and the guide devices by 20. It can be seen clearly from this figure that both the conveying part and the return part of the hose belt conveyor lie in the same plane, and that the return part is realized by taking angles in the horizontal plane. It can also be seen that more than one drive unit 10 is present. In this way it is possible to design the belt in such a way that it can extend over very great lengths. Due to the fact that the drive forces are applied at various points, the length of the hose belt conveyor is in fact unlimited. In FIG. 4 supply stations for material are indicated by 19. These may comprise any device known in the prior art. A discharge station is indicated by 21. It is shown in more detail in FIG. 5. As can be seen from this figure, it consists of a worm conveyor 22, consisting of a tube 23 in which a worm 24 driven by a motor 25 is situated. This tube projects through a guide 26 for moving thickened parts 3 of the hose belt conveyor slightly away from each other. It goes without saying that it is possible to achieve such an opening with other guide means. Due to the fact that the belt moves further in the same horizontal plane after material is removed, it is not necessary for all the material to be removed from it. For, the remaining material can be removed in a subsequent passage through, and this remaining material will not be exposed to the environment on the way to the next passage through, because the hose belt conveyor will remain closed.

Figure 6:
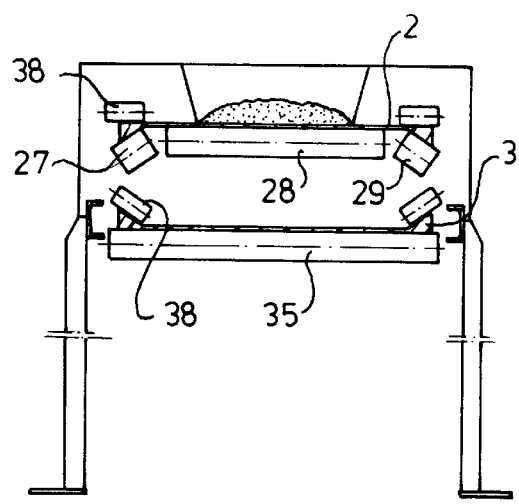
FIG. 6 shows the hose belt conveyor according to the invention, opened out.

Finally, FIG. 6 shows a construction in which, as in the case of conventional devices, the pocket conveyor is in fact provided with a return part which lies in a different vertical plane from that of the conveyor belt. For this purpose, the belt is folded open and supported near the delivery end on rollers 27, 28, 29. The belt can be conveyed back over a roller with relatively small diameter. This is because little or no longitudinal reinforcements are present in the belt. For, the belt is driven at different places so that the driving force extends over a relatively short length. With the construction shown in FIG. 6, a self-centering operation is obtained by means of rollers 27 and 29 interacting with the thickened parts 3. The way in which the return part is guided supported on rollers 35 is shown in the lower part of FIG. 6. In the case of this embodiment it is possible to provide the hose belt conveyor with a head drive having a roller in the usual way.

Although the invention is described above with reference to a preferred embodiment, it will be clear to those skilled in the art that many modifications may be made to it. For example, combinations with return movement in the same horizontal and vertical plane are possible.

These and similar modifications are all considered to lie within the scope of the appended claims.

What is claimed is:

1. Hose belt conveyor, comprising an elongated belt which is bendable into a tubular shape with opposite abutting longitudinal edges being each provided with a thickened portion, each thickened portion extending continuously about the entire circumferential extent of the elongated belt, said thickened portions diverging to the edges of the belt thereby forming a substantial V-shaped longitudinal belt seam, which is engaged by a belt drive, wherein the angle ($\alpha$) of the V-shaped longitudinal belt seam between diverging sides of the thickened portions ranges between 35° and 70°, and sides of said thickened portions abutting via the longitudinal edges of the belt in a continuous way, each thickened portion including a surface structured and arranged to engage a respective belt drive, each of said surfaces of said thickened portions being substantially entirely planar throughout the circumferential extent.

2. Hose belt conveyor according to claim 1, wherein the angle ranges between 50° and 60°.

3. Hose belt conveyor according to claim 1, further comprising at least one reinforcement extending in the lengthwise direction.

4. Hose belt conveyor according to claim 1, further comprising a reinforcement extending in the transverse direction.

5. Hose belt conveyor according to claim 1, wherein the belt drive comprises at least one pair of rollers, which are positioned such that their engagement surfaces correspond to said V-shaped angle.

6. Hose belt conveyor according to claim 5, comprising a multiplicity of pairs of rollers in axial direction of said hose belt conveyor.

7. Hose belt conveyor according to claim 6, wherein at least one of said pairs of rollers comprises a roller having a cylindrical surface.

8. Hose belt conveyor according to claim 6, comprising between two pairs of rollers a slide support for each thickened portion of the belt.

9. Hose belt conveyor according to claim 8, wherein each slide support comprises a smooth contact surface.

10. Hose belt conveyor according to claim 8, wherein each slide support comprises openings for supplying fluid under pressure.

11. Hose belt conveyor according to claim 5, wherein the belt conveyor comprises a return run and a conveying run, and the return run has the same belt configuration as the conveying run.

* * * * *